No. 646,926. Patented Apr. 3, 1900.
T. R. BROWNE.
AUTOMATIC STEAM VALVE AND PUMP.
(Application filed Feb. 18, 1899.)
(No Model.) 3 Sheets—Sheet 2.
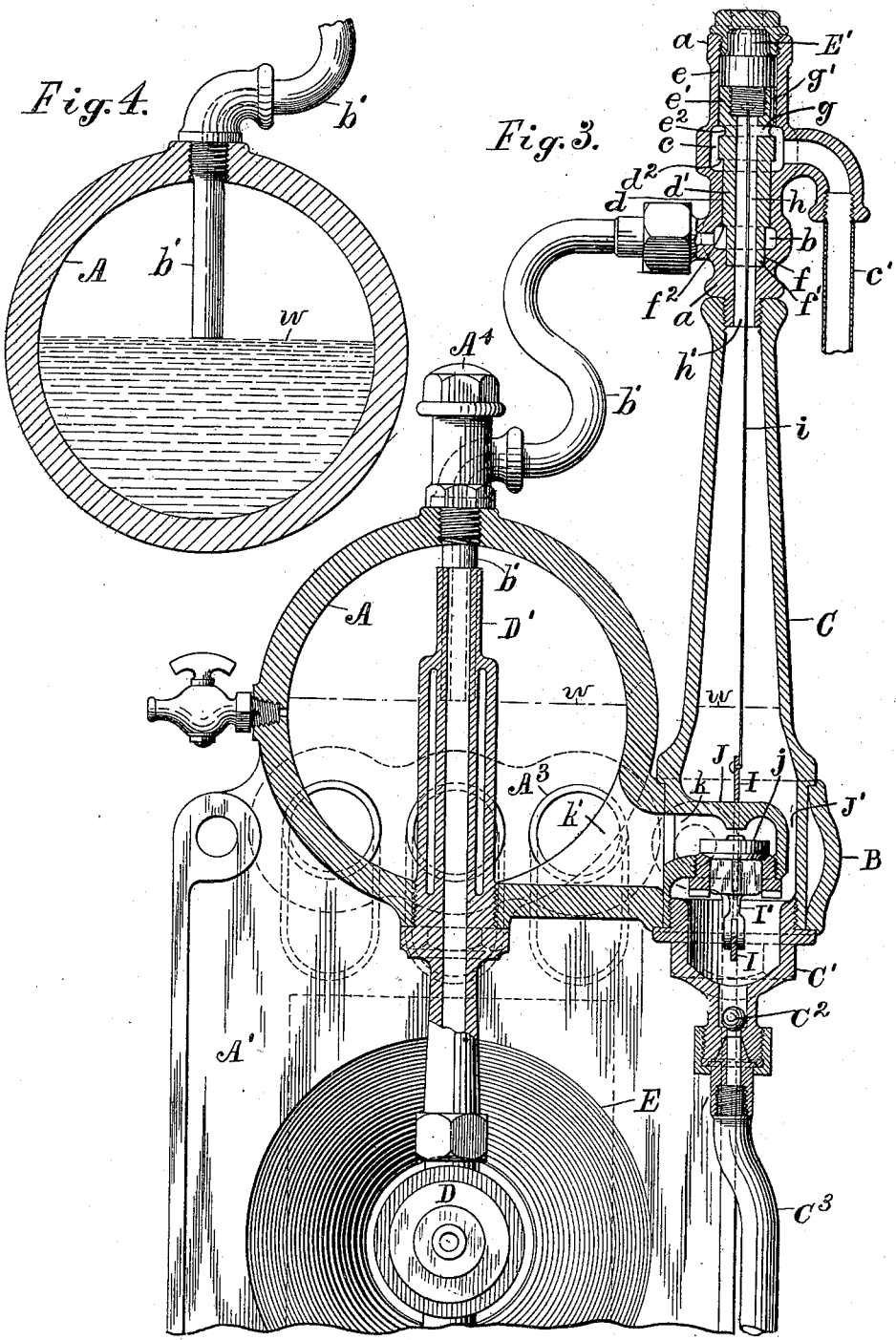

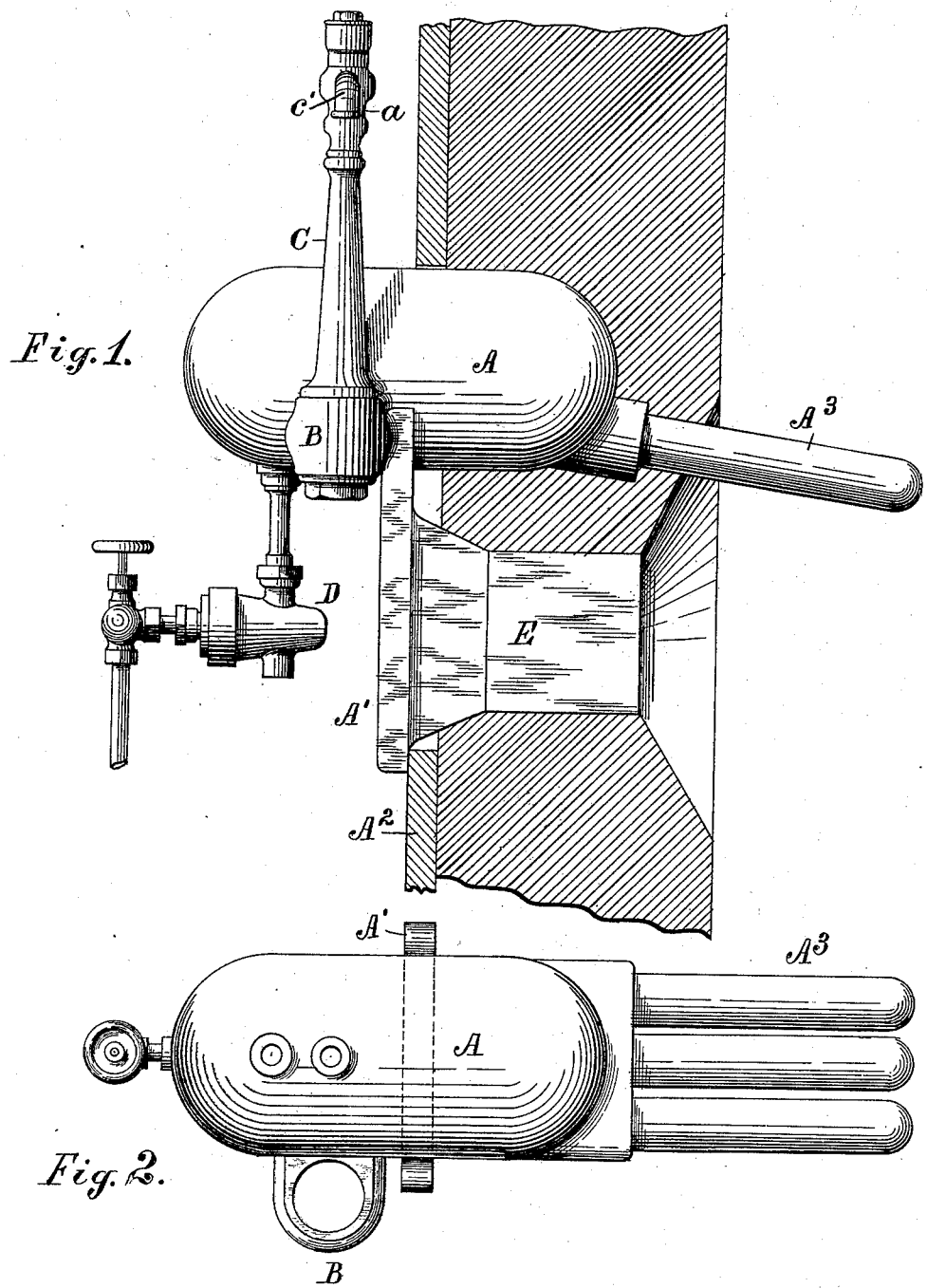

No. 646,926. Patented Apr. 3, 1900.
T. R. BROWNE.
AUTOMATIC STEAM VALVE AND PUMP.
(Application filed Feb. 18, 1899.)
(No Model.) 3 Sheets—Sheet 3.
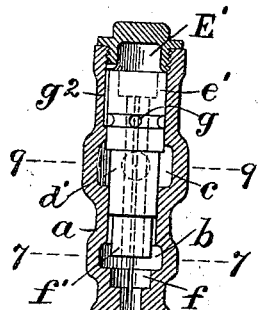
Fig. 5.
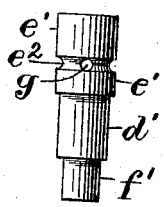
Fig. 10.
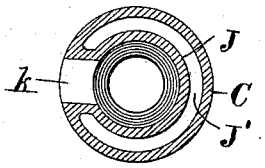
Fig. 6.
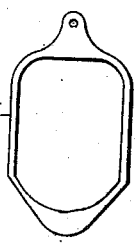
Fig. 8.
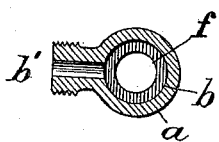
Fig. 7.
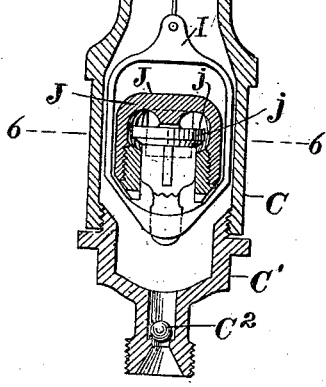
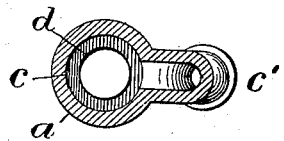
Fig. 9.
Attest:
L. Lee
Edw. F. Kinsey
Inventor.
Thomas R. Browne, per
Thomas S. Crane, Atty.

UNITED STATES PATENT OFFICE.

THOMAS R. BROWNE, OF ALTOONA, PENNSYLVANIA.

AUTOMATIC STEAM VALVE AND PUMP.

SPECIFICATION forming part of Letters Patent No. 646,926, dated April 3, 1900.

Application filed February 18, 1899. Serial No. 705,956. (No model.)

*To all whom it may concern:*

Be it known that I, THOMAS R. BROWNE, a citizen of the United States, residing at Altoona, county of Blair, State of Pennsylvania, have invented certain new and useful Improvements in Automatic Steam Valves and Pumps, fully described and represented in the following specification and the accompanying drawings, forming a part of the same.

The object of the present invention is to furnish an improved construction for a steam-moved valve and also to combine the same with a water-feeding chamber for producing pressure intermittingly upon the water within such chamber and to actuate the valve and the water within the chamber, so as to supply the feed-water to a steam-boiler and preserve a uniform water-level within such boiler.

Steam-moved valves have been used before in connection with a water-feeding chamber; but their action prior to my invention has been controlled by additional mechanical devices, and especially by a float resting upon the water in the water-chamber, which serves to reverse the valve when the water reaches the desired limits of travel. In my invention the valve is self-reversing and requires no auxiliary valve or float within the boiler or water-feeding chamber to effect its movements. These appliances are especially desirable in connection with very small boilers, in which the evaporation is rapid, and particularly upon a boiler combined with a liquid-fuel burner to operate the said burner where no other steam-supply is available. The valve is provided with differential pistons and consists of a round body having cylindrical portions of different diameters forming pistons upon which the pressure of the steam operates alternately and is combined with a valve-casing having differential cylinders in line with one another and a live-steam chamber and a so-called "operative" chamber connected, respectively, with the larger and smaller cylinders, so that the live-steam chamber and the operative chamber open, respectively, upon the opposite faces of the differential piston-valve. The pressure upon the smaller piston first operates to drive the valve in one direction, and such movement of the valve admits steam to the operative chamber, where its pressure overbalances that upon the smaller piston and reverses the movement of the valve. To use the valve in connection with a water-feeding appliance, the water-chamber is connected by a check-valve with the water-space in the steam-boiler and is provided with a water-supply under a natural or artificial head sufficient to fill it with water through a check-valve. A steam-port is opened and closed by the movements of the valve to supply steam intermittingly to the water-feeding chamber, and when the steam is admitted to the top of such chamber the water therein is under a balanced pressure and is enabled to flow by its own gravity into the boiler through the inlet check-valve. The steam for operating the valve and supplying the water-feeding chamber is drawn from the boiler near the water-line, and when the water rises to such level it prevents the flow of steam to the valve, and the feeding device then ceases to operate and renews its operation when the water-level falls, the apparatus thus maintaining the water-level in the boiler automatically.

The valve is adapted for various uses; but its essential features of construction will be understood by reference to the annexed drawings, in which a small boiler is illustrated in connection with a liquid-fuel burner which requires a supply of steam to eject the oil.

Figure 1 shows the boiler and its attachments with the wall of a furnace in section adjacent to the burner. Fig. 2 is a plan of the boiler with the socket for the pump-chamber. Fig. 3 is an elevation of the flange A' with a transverse vertical section of the valve and steam-box upon a larger scale than Fig. 1, the view being taken (where hatched) through the center of the valve. Fig. 4 is a section of the steam-box, showing the relation of the steam connection to the water-line. Fig. 5 is a vertical section of the valve and water-feeding chamber at the center line of the valve at right angles to the view shown in Fig. 3. Fig. 6 is a plan in section on line 6 6 in Fig. 5. Fig. 7 is a plan in section on line 7 7 in Fig. 5. Fig. 8 is an elevation of the lifting-strap for the check-valve, and Fig. 9 is a plan in section on line 9 9 in Fig. 5. Fig. 10 is an elevation of the valve detached from its casing.

A designates the steam box of the boiler, which is represented of cast-iron, with a hollow lug or socket B at one side, in which the lower end of the water-feeding chamber C is secured. The steam-box is shown provided with flange A' for attachment to a furnace-front A² and with the nozzle E for directing an oil-spray into the furnace from a spraying appliance D. The steam-box supplies the oil-spraying appliance D with steam from its upper part through a pipe D'. Water-tubes A³, extended from the steam-box into the furnace, serve to generate the required steam, and a safety-valve A⁴ limits the pressure.

The valve-casing $a$ is shown secured upon the top of the water-feeding chamber C and formed with an annular live-steam chamber $b$, having a connection from the pipe $b'$ with the interior of the steam-box at the water-level, as shown particularly in Fig. 4.

$c$ designates an annular exhaust-chamber provided with exhaust-outlet $c'$ and separated from the steam-chamber $b$ by a cylindrical bore $d$. Upon the opposite side of the exhaust-chamber is a larger bore $e$, and the piston-valve (shown separately in Fig. 10) is provided with cylindrical portions $d'$ and $e'$, adapted to fit the two cylinders and to form an intervening shoulder $d^2$. The cylinder $e'$ is extended upward sufficiently to afford the valve a suitable movement, and a chamber E' is formed in open communication with such cylinder to receive steam for reversing the movement of the valve. Such chamber is termed an "operative" chamber herein to distinguish it from the live-steam chamber $b$.

A cylindrical recess $f$, smaller than the cylinder $d$, is formed below the steam-chamber $b$, and a portion $f'$ upon the lower end of the valve is extended from the portion $d'$ and fitted to such recess, forming an annular shoulder $f^2$ between the two portions. From the bottom of the recess a passage $h'$ is extended into the water-feeding chamber C, thus connecting the live-steam chamber $b$ with the water-feeding chamber when the valve is withdrawn from the recess $f$. The casing is thus provided with three cylindrical bores upon the same axial line and the piston-valve with three cylindrical portions fitted, respectively, to such bores, with the live steam in the chamber $b$ pressing constantly upon the shoulder $f^2$. The larger piston $e'$ is formed with a groove $e^2$ intermediate to its ends, and a hole $g$ is carried from such groove into the bore $h$, which is extended from the smaller end of the valve nearly to the opposite end. A minute passage $g'$ extends from the top of the valve in Fig. 3 to the groove $e^2$ to supply steam to the operative chamber E'. An equivalent passage $g^2$ is shown in the wall of the cylinder $e$ in Fig. 5, which connects the operative chamber with the groove when the valve is elevated and serves, the same as the passage $g'$, to gradually introduce and accumulate steam under pressure in the operative chamber to reverse the valve when raised. The relative advantages of the two constructions are referred to hereinafter.

A wire or rod $i$ is attached to the plug at the top of the bore $h$ and extended downward to actuate the check-valve $j$, which admits water from the water-feeding chamber to the boiler. The rod $i$ is connected with the check-valve by a lifter I, extended around the box J to a projection I' upon the bottom of the check-valve. Such valve is seated in a check-valve box J, which is formed within the bottom of the water-feeding chamber and communicates by passage $k$ with a passage $k'$, extended from the boiler into the socket B.

The lower end of the chamber C is provided with a screw-cap C', containing a seat for a water-inlet valve C². A pipe C³ supplies the water to such inlet-valve under sufficient pressure to fill the chamber C, the water flowing around the sides of the check-valve box J through the space J', (shown in Figs. 3 and 6,) while the check-valve $j$ normally closes the passage to the boiler.

It is obvious that steam-pressure introduced into the top of the water-chamber when filled with water would operate to firmly close the water-inlet valve C² and would permit the lifting of the check-valve $j$ and the flow of the water from the chamber C into the boiler.

With the arrangement shown the water would not wholly drain the water-feeding chamber, but would descend to the level $w$, corresponding to the water-level in the boiler.

The steam-valve is adapted to operate in any position, but is shown in a vertical position in the drawings, with the smaller end at the bottom. In Fig. 3 the valve is shown in its lowest position, in which the steam is shut off from the water-feeding chamber C, and in Fig. 5 in its highest position, in which the steam flows freely to the water-feeding chamber and gradually into the operative chamber E' through the hole $g^2$.

The operation of the steam-valve is as follows: Referring to Fig. 3, the valve is shown in its extreme downward position or as having cut off the supply of live steam to the chamber C. The steam contained in chamber C will find exhaust to the atmosphere by means of the opening $h$ in the valve, the hole $g$, annular cavity $c$, and the pipe $c'$. The check-valve $j$ having been caused to seat by the pressure contained in the steam-box A due to the sudden drop of pressure caused by exhaust of the steam contained in the chamber C, water will flow through the pipe C³ and around the check C² into the chamber C, the time required for this filling of the chamber C with water being secured by a delay in the upward movement of the valve due to the slow escape of the steam contained in the operative chamber E' through the small hole $g'$ to the atmosphere. The pressure in the chamber C having thus been reduced to the required point, the valve will be caused to move upward with a force due to the pressure upon the annular surface $f^2$, at which point the exhaust above referred to (and which is provided by the groove $e^2$ in the largest part of the valve) will have been more than closed. When the valve has traveled a little out of the recess $f$, the total area of the portion $d'$ will be acted upon by the steam-pressure and the valve caused to rapidly travel upward until the lifting-yoke I shall have come in contact with the lower projection of the check-valve $j$. By this time sufficient steam has been admitted to the chamber C, and, acting on top of the water, caused a counter-pressure on the under side of the check-valve $j$, leaving only as a matter of resistance to its upward movement the difference between the smaller and larger diameters of its seated portion. The area of the steam-valve acted upon by the pressure from the boiler overcomes this resistance and lifts the check-valve $j$ from its seat, allowing the water contained in the chamber C to find the level of that contained in the boiler by gravity. During this operation some of the steam discharged into the chamber C has found its way (by means of the opening $h$ and the minute opening $g'$ in the steam-valve) to the upper chamber E', in which, as soon as it has accumulated a pressure nearly or equal to the pressure contained in the boiler or the chamber C, it will act upon the area of the larger or upper end $e'$ of the steam-valve, and this area, being greater by exactly the difference between its area and the area of the portion $d'$, will cause the valve to travel downward, shutting off the live-steam supply and providing an exhaust to the atmosphere for the steam contained in the chamber C, as hereinbefore described. This cycle of operations will be continuous as long as steam is supplied through the pipe $b'$, excepting when the water-line $w$ in the boiler shall have reached a point level with the lowest extremity of the steam-pipe $b'$, in which case water will be caused to travel through the pipe $b'$ and owing to its non-expansive qualities will prevent the action of the valve, as described, causing the steam-valve to remain in a stationary or more or less stationary condition until the water-line shall have fallen sufficiently to permit the passage of steam, in which event the operations of the steam-valve will be again continued, as described. The water-feeding chamber is tapered inwardly toward the top to reduce the area of water in contact with the steam, which prevents the rapid condensation of the steam and enables the water to flow into the boiler in the short time allowed for such purpose. With the proportions shown in the drawings and a supply of water to the water-feeding chamber under a pressure of five pounds per square inch the valve will with a boiler-pressure of one hundred pounds per square inch reciprocate about forty times per minute; but a speed of the valve adapted to any other object is readily produced by varying the proportions of the differential pistons and the passages through which the steam is permitted to flow.

It will be observed that the reversal of the steam-valve is dependent wholly upon the gradual fall of pressure in the operative chamber E' and that such fall of pressure may be greatly increased by forming the same with thin walls and of such dimensions as to rapidly radiate the heat from the contained steam. The rapidity of the valve's movements is therefore independent of the filling or discharge of the water-feeding chamber; but the practical operation of the entire combination is to renew the supply of water to the boiler at intervals, so as to maintain the water closely at the desired level.

As the device is organized especially to supply a small independent steam-boiler in connection with a furnace having a liquid-fuel burner, I have made a specific claim to the combination of all these instrumentalities.

The connection between the steam-valve and the check-valve $j$ is provided only because the limited height of the water-feeding chamber C in an apparatus of compact construction does not furnish a sufficient head of water to overcome the weight of the check-valve $j$ if made of metal, as usual; but it will of course be obvious that any such means of moving the check-valve would be unnecessary if the water-chamber were made of sufficient height to develop the required head. In respect to this part of the construction any pipe of suitable height and capacity could form the chamber C and be connected with the steam-boiler and automatic steam-valve, as shown herein.

The essential feature of the steam-valve itself is the provision of pistons of smaller and larger diameters opening, respectively, into a live-steam chamber and an operative chamber, with a passage adapted when the valve is moved by the smaller piston to admit steam to the operative chamber for reversing the valve and a passage adapted to supply steam gradually to the operative chamber when the valve is raised, whereby the accumulation of steam in such chamber operates to reverse the valve independent of all mechanical agencies.

The combination of the pistons $d'$ and $e'$ I have termed a "differential piston-valve" and the cylinders $d$ and $e$ "differential cylinders." The lower portion $f'$ of the valve serves merely as a cut-off or check to stop the flow of steam (when necessary) to the water-feeding chamber C, and any other means operated by the reciprocating valve for opening and closing a passage to the steam-chamber C would be an equivalent therefor.

Where the hole $g'$ is used, as shown in Fig. 3, to supply the steam to the operative chamber, it also furnishes a means of exhausting the steam from said chamber to the exhaust-pipe $c'$ when the valve is lowered; but where the passage is formed in the wall of the cylinder, as at $g^2$ in Fig. 5, it serves to supply the operative chamber with steam, but furnishes no exhaust-outlet when the valve is lowered, and such construction may be employed when the gradual fall of pressure in the operative chamber is to be produced exclusively by radiation from the walls of the chamber. Such radiation produces a condensation of the steam, and the resulting water escapes through the passage at each reciprocation of the valve.

The pump is shown in the drawings connected with a small boiler for use upon a liquid-fuel burner; but it is applicable to other boilers and to other uses than that of feeding water to a steam-boiler, as the reciprocation of the valve is independent of the water in the water-feeding chamber and is governed only by the fall of pressure in the operative chamber $E'$. Such fall may be effected, as already described, by a connection with an exhaust-passage or by radiation from the walls of the operative chamber.

Having thus set forth the nature of the invention, what is claimed herein is—

1. In an automatic steam-valve for intermittingly supplying steam, the combination, of the valve-casing having larger and smaller cylinders $e$ and $d$ upon the same line, an operative steam-chamber connected to the larger cylinder, of a steam-outlet at the end of the smaller cylinder, connected with a working chamber, an exhaust-chamber at the junction of the two cylinders, and a steam-inlet at the end of the smaller cylinder with a seat to close the steam-outlet, a differential piston-valve fitted to the said cylinders and seated upon the outlet of the smaller cylinder, and a passage adapted by the raising of the valve to supply steam gradually to the operative chamber whereby the accumulation of steam in such chamber operates finally to reverse the valve independently of all other agencies, substantially as herein set forth.

2. In an automatic steam-valve for intermittingly supplying steam, the combination, with the valve-casing having larger and smaller cylinders $e$ and $d$ upon the same line, and a live-steam chamber $b$ and operative chamber connected respectively with such cylinders, a differential piston fitted to such cylinders and provided with the shoulder $d^2$ and with the internal passage $h$ and lateral passage $g$, as set forth, an outlet from the end of the casing closed when the valve is seated, a steam-inlet connected with such outlet when the valve is suitably raised, an exhaust-chamber surrounding the shoulder $d^2$ and connected with the lateral passage $g$ when the valve is seated, and a passage adapted by the raising of the valve to supply steam gradually to the operative chamber, whereby the accumulation of steam in such chamber operates to reverse the valve, substantially as herein set forth.

3. In an automatic steam-valve for intermittingly supplying steam, the combination, with the valve-casing having larger and smaller cylinders $e$ and $d$ upon the same line, and a live-steam chamber $b$ and operative chamber connected respectively with such cylinders, a differential piston fitted to such cylinders and provided with the shoulder $d^2$ and with the internal passage $h$ and lateral passage $g$ as set forth, an outlet from the end of the casing to a working chamber requiring steam, a steam-inlet connected with such outlet when the valve is suitably raised, an exhaust-chamber surrounding the shoulder $d^2$ and connected with the lateral passage $g$ when the valve is seated, and a minute passage $g'$ connecting the operative chamber with the steam-chamber when the valve is supplying the working chamber with steam, whereby the valve is reversed exclusively by the accumulation of steam in the operative chamber, substantially as herein set forth.

4. In an automatic steam-valve for intermittingly supplying steam, the combination, with a valve-casing having differential cylinders upon the same line, with an operative chamber extended from the larger cylinder, and having an annular live-steam chamber and an annular exhaust-chamber formed respectively around the smaller and larger cylinders, of a differential piston-valve fitted to such cylinders with the live steam in the smaller cylinder operating upon the smaller piston, a passage through the valve adapted when the valve is moved by the smaller piston to admit steam temporarily to the operative chamber to act upon the larger piston for reversing the valve, and a passage through the valve adapted when the valve is reversed to connect the operative chamber with the piston, whereby the steam and exhaust passages are controlled wholly by the movements of the valve, to reverse the valve independently of all other agencies, substantially as herein set forth.

5. The combination, with a steam-boiler having a socket upon one side with passage leading thereinto, and the water-feeding chamber C secured in such socket and having a check-valve box communicating with such passage, and a water-inlet provided with a check-valve, of a valve-casing, a reciprocating valve operated therein, and a steam-port opened and closed by the movements of the valve and operating to supply steam intermittingly to the water-feeding chamber, substantially as herein set forth.

6. The combination, with a steam-boiler, of a water-feeding chamber connected by a check-valve with the water-space of such boiler, a valve-casing having differential cylinders upon the same line and a live-steam chamber and operative chamber connected respectively with the smaller and larger cylinders, and a connection between the live-steam chamber and the steam-space of the boiler near the water-line, a differential piston-valve fitted to the said cylinders and operated as set forth, and a steam-port opened and closed by the movements of the valve and operating to supply steam intermittingly to the water-feeding chamber, as and for the purpose set forth.

7. In an automatic steam valve and pump, the combination of the steam-box A having the integral flange A' with burner-nozzle E thereon, and the integral socket B having the water-feeding chamber C fitted thereto and connected with a water-supply and with the interior of the steam-box by passage k and check-valve j, and the steam-box having water-tubes A³ to project into a combustion-chamber, and having the oil-spraying appliance D suspended below the steam-box in line with the nozzle E, and connected with the upper part of the steam-box by pipe D', and a differential piston-valve applied to the top of the water-feeding chamber and connected with the steam-box and provided with the operative chamber E' and with suitable steam and exhaust passages to reciprocate the valve and supply steam intermittingly to the water-feeding chamber, substantially as herein set forth.

8. The combination, with the differential piston-valve and its casing constructed and operated substantially as set forth, of a water-feeding chamber C having a water-supply under pressure, an outlet check-valve arranged in the lower part, and the piston-valve secured upon the upper part of the chamber and connected with the outlet check-valve so as to raise the same when the piston-valve is lifted, substantially as herein set forth.

In testimony whereof I have hereunto set my hand in the presence of two subscribing witnesses.

THOMAS R. BROWNE.

Witnesses:
GEO. W. KAISER,
H. A. ANDERSON.